C. S. SCOTT.
OPEN BELLIED PNEUMATIC TIRE SHOE.
APPLICATION FILED MAR. 7, 1910.
1,067,844.
Patented July 22, 1913.
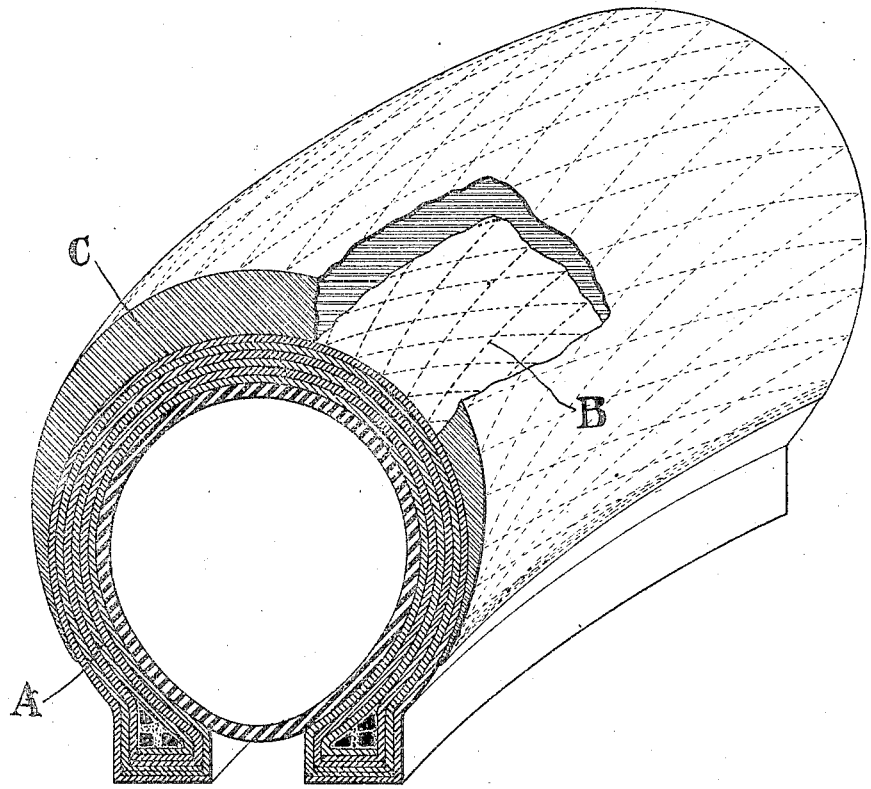
WITNESSES:
INVENTOR
Charles S. Scott.
BY
ATTORNEYS

UNITED STATES PATENT OFFICE.

CHARLES S. SCOTT, OF CADIZ, OHIO.

OPEN-BELLIED PNEUMATIC-TIRE SHOE.

1,067,844.　　　　Specification of Letters Patent.　　Patented July 22, 1913.

Application filed March 7, 1910. Serial No. 547,719.

*To all whom it may concern:*

Be it known that I, CHARLES S. SCOTT, a citizen of the United States, and a resident of Cadiz, Harrison county, Ohio, have invented a new and useful Improvement in Open-Bellied Pneumatic-Tire Shoes, of which the following is a specification.

The type of tire-shoe now used on automobiles is composed of three or more layers of canvas or other textile fabric supplied with a rubber cover for the tread portion. Heretofore the layers of fabric have been secured together by a rubber cement which has been hardened in the vulcanizing process to secure the layers to each other. This hardened rubber makes the tire hard and unresilient. In case of accident, a crack or break in one layer of fabric will tend to carry through to adjacent layers. If dirt seeps in between the layers, it will keep working between them, cut them apart and permit rotting, until there is no connection between the surfaces. Besides, the cement or friction, as it is called, for connecting the layers of fabric must be made of pure rubber and is expensive. I avoid all these objections by connecting the several layers of fabric constituting an open-bellied pneumatic tire-shoe not by cement but by cross lines of stitching which have both a longitudinal and transverse direction. Not only is this process of connection cheaper than the cement heretofore used, but it is better. The tire remains softer and more resilient; but resiliency is the most important quality of pneumatic tires. Cracks or breaks in one layer are stopped at the line of stitches and do not carry on. Dirt between the layers of fabric gets no opportunity to work along, but is also stopped at the first line of stitches to which it comes. Then, too, the stitches last with age, whereas rubber cement deteriorates and loses its cementing quality. Finally, the process of making the stitched tire is cheaper and simpler than that of connecting the layers of such a tire by a sticky cement which has to be put into the vulcanizing mold quickly.

In the drawings,—the figure shows a sectional perspective of an open-bellied pneumatic tire-shoe embodying my invention, part of the rubber covering being broken away.

It will be seen that my tire-shoe is shown as composed of six layers of fabric A, which are sewn together by stitches B. Since these stitches are diagonal and cross each other, it is clear that some of them may be looked upon as longitudinal and others as transverse in direction. In fact I preferably use intersecting sets of oblique stitches forming a quilting.

While I have shown my tire as being of inextensible-edge type, it is manifest that I may use any other known type of edge.

The rubber cover C is also secured to the body of the tire by stitching.

I claim,—

An open-bellied pneumatic tire-shoe composed of a multiplicity of layers of fabric and a rubber covering, secured together by a quilting of stitches, substantially as described.

In testimony whereof I have signed my name to this specification in the presence of two subscribing witnesses.

CHAS. S. SCOTT.

Witnesses:
R. H. MINTEER,
J. G. COIL.